Figure 1:
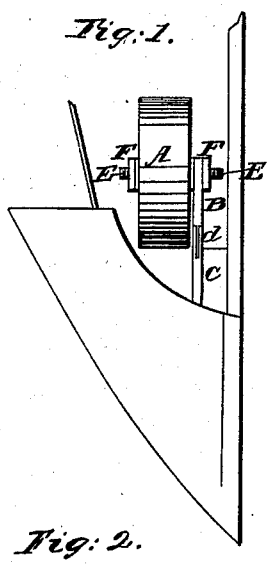

I. LONG.
Plow.

No. 3,465

Patented Mar. 9. 1844.

UNITED STATES PATENT OFFICE.

ISRAEL LONG, OF BUCYRUS, OHIO.

IMPROVEMENT IN WHEEL-PLOWS.

Specification forming part of Letters Patent No. 3,465, dated March 9, 1844.

*To all whom it may concern:*

Be it known that I, ISRAEL LONG, of Bucyrus, in the county of Crawford and State of Ohio, have invented a new and useful Improvement in Plows by means of the application of an adjustable wheel at the bottom of the plow and at the center of the same, whereby friction is decreased and the turning and drawing back of the plow are greatly facilitated, the wheel to be of a size proportioned to the size of the plow, and may be applied to all and any size and kind of bar-share plows, of which the following is a specification.

The nature of my invention consists in providing a wheel of a size adapted to that of the plow as shown in the drawings, and attached to the plow, as hereinafter described.

Figure 1 represents the part of a plow inverted, wherein A shows an edge view of the wheel; B, the edge of a bar of iron bolted to the sheath, running back horizontally parallel with the landside as high as the center of the wheel. C represents a cross-section of the sheath. $d$ represents a joint in the bar of iron, so made as that the wheel may be elevated or depressed at pleasure. E E represents a bolt running through the bar of iron and center of the wheel, forming a journal or axis for the wheel. F F are nuts or burrs, screwed on to each end of the axis to confine the wheel, as circumstances may demand.

Figure 2:
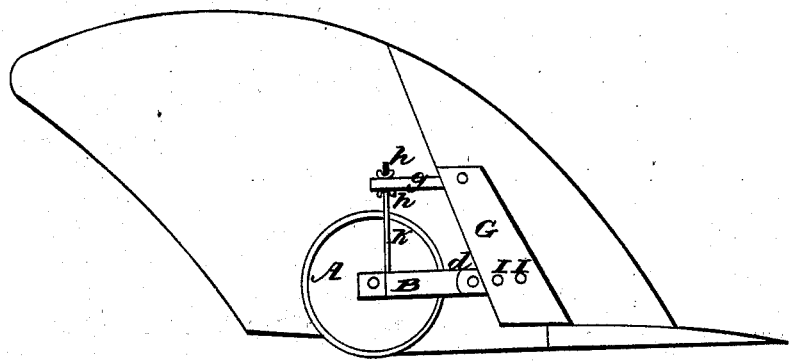

Fig. 2 shows the vertical elevation of part of a plow without the landside, showing the wheel and its fixtures, in which A exhibits a side view of the wheel; B, of the bar of iron described in Fig. 1, with a side view of the joint at $d$. C is the sheth, with the heads of the bolts $i\ i$ fastening the bar of iron to it. $g$ shows a horizontal arm of wood framed into the sheth above and over the bar of iron, and parallel therewith, for the purpose of receiving a rod, $k$, the lower end of which is fastened into the bar of iron, and, running up through the arm $g$ of wood, has a nut on the iron rod $k$ above and below arm $g$, as shown at $h\ h$, for the purpose of elevating or depressing the wheel.

Figure 3:
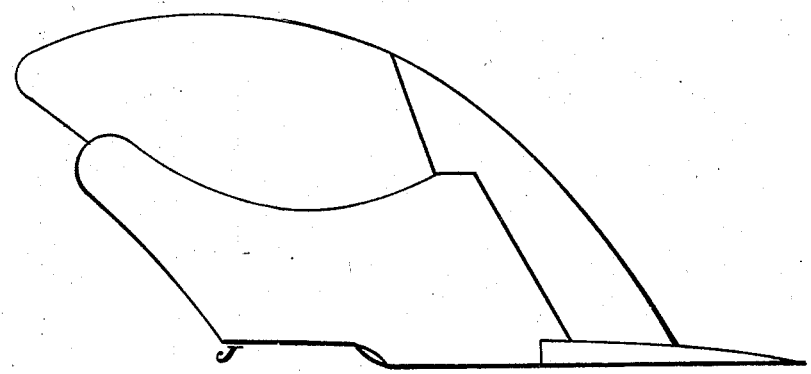

Fig. 3 represents a vertical elevation of the part of a plow, with the landside on, exhibiting a curve taken out of the landside at J, for the purpose of throwing the weight of the plow onto the wheel by bearing down on the handles. The bar of iron B is straight, and has a rule-joint in it at $d$. The rod $k$ is a strong straight rod, that extends up vertically through the horizontal arm $g$ above. The operation of this adjustable wheel is to incline the point of the plow into the ground more or less, and thus making it run as deep as desired.

Having thus fully described my invention, I do not claim as new inserting a wheel for the purpose of relieving the heel of the landside and mold-board of friction, as that has been done; but

What I do claim as my invention, and desire to secure by Letters Patent, is—

The combination of the roller with the plow, in the manner described, by means of the jointed bar B and rod $k$, so as to render it adjustable.

ISRAEL LONG.

Witnesses:
  J. B. LARWILL,
  I. L. RUHL.